May 31, 1927.
K. IKEDA ET AL
1,630,660
PROCESS OF MAKING AN ADSORBENT AND THE PRODUCT THEREOF
Original Filed June 2, 1922
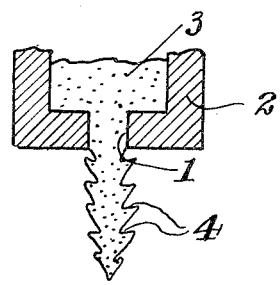
Inventors
K. Ikeda
H. Isobe
T. Okazawa Patented May 31, 1927.

1,630,660

UNITED STATES PATENT OFFICE.

KIKUNAE IKEDA AND HAJIME ISOBE, OF TOKYO, AND TSURUJI OKAZAWA, OF KITATOSHIMA-GORI, JAPAN, ASSIGNORS TO ZAIDAN HOJIN RIKAGAKU KENKYUJO, OF TOKYO, JAPAN.

PROCESS OF MAKING AN ADSORBENT AND THE PRODUCT THEREOF.

Original application filed June 2, 1922, Serial No. 565,431, and in Japan March 17, 1921. Divided and this application filed December 27, 1923. Serial No. 683,069.

This invention has reference to a method of preparing an adsorpting agent preferably though not necessarily adapted for use in drying air.

The object of the invention consists in the method of treating acidic clay such as fuller's earth, Florida earth or charcoal and like porous materials so as to render the finished product highly efficient in adsorpting moisture from the air.

Other objects as well as the nature, characteristic features and scope of this invention will be more readily apparent from the following description taken in connection with the accompanying drawings and pointed out in the claim forming a part of this specification. This application is a division of my application 565,431, filed June 2, 1922, which has become Patent 1,541,147.

In the drawings, the figure illustrates the portion of the apparatus used during the operation of the acidic clay as an adsorpting agent.

Experiments have shown that various kinds of acidic clay such as fuller's earth and Florida earth are best fitted for use in the preparation of an effective adsorpting agent and in carrying out the process the acidic clay is first kneaded with water.

The acidic clay is first kneaded with water, the amount of which is so regulated that there is 80 to 110 parts of total water to 100 parts of completely dehydrated clay. The kneaded mass has now acquired the proper degree of stiffness. It is now pressed through aperture 1 of appropriate size, for instance, of 3 to 10 millimeters in diameter in the bottom of the cylinder 2. On account of the friction the motion of the kneaded mass 3 while passing through the aperture is not uniform, the velocity being greatest at the center and diminishing towards the periphery. As the mass is somewhat stiff and not quite plastic, this leads to the formation of rods with deeply indented or serrated surface 4 as shown in the drawing. The indentation is deeper when the amount of water is decreased. The indented material breaks off spontaneously at points where it is deeply indented and thus forms sections of various lengths ranging between ½ to 3 to 4 centimeters.

These pieces are now baked at a temperature ranging from 150°–600°. It is best not to use too high a temperature nor subject the same to a long period of heating, because the adsorptive power is thereby impaired. When the baking is properly performed the pieces are not fragile and can bear some degree of rough handling. They show scarcely any tendency to give off dust to rapidly moving air.

When air is passed through a mass of such small pieces of acidic clay, prepared in the manner described above, it is deprived of its moisture very rapidly, because the pieces present a developed surface and facilitate the diffusion of gases into and out of the pores of the earth. On the other hand, the resistance offered by the mass to the passage of rapidly moving air is comparatively small, because the interstices between the pieces are relatively large.

The efficiency of the acidic clay properly prepared may be judged from the following data. A mass of the acidic clay in sticks, weighing half a ton, occupies a volume of one cubic meter. 2500 cubic meters of air, containing 20 grammes of aqueous vapour per cubic meter, can be passed through the mass at the rate of 10 cubic meters per minute, the outcoming air is almost dry, only the last portion retaining something like 2 grammes of moisture per cubic meter. The velocity of the passage of air can be increased five or six times, but the desiccation will not be so good, about one quarter of the moisture remaining in the air.

It is believed in view of the foregoing that a further detailed description of the invention is entirely unnecessary. Likewise, it is believed that the advantages of the invention will be readily apparent.

Having thus fully described the invention what is claimed as new and desired to be secured by Letters Patent is:—

1. An adsorbent consisting of a stick of dehydrated acidic clay having an uneven surface.

2. A process of treating fuller's earth,

Florida earth, or other acidic clay for use as an adsorpting agent consisting in first kneading the clay with water then forcing the kneaded clay through a relatively small opening in a receptacle so as to shape the same into a stick-like form having indented surfaces, breaking the portions into pieces of the desired length, and finally baking the pieces to a temperature between 150° C. to 600° C. to increase the rigidity thereof.

In testimony whereof we hereunto affix our signatures.

KIKUNAE IKEDA.
HAJIME ISOBE.
TSURUJI OKAZAWA.